(12) United States Patent
Perlsweig et al.

(10) Patent No.: US 7,430,988 B2
(45) Date of Patent: Oct. 7, 2008

(54) ANIMAL ACTUATED DRINKING FOUNTAIN AND METHOD

(75) Inventors: Leon Perlsweig, Woodland Hills, CA (US); Hertsel Corech, Los Angeles, CA (US)

(73) Assignee: Leon Perlsweig, Woodland Hills, CA (US)

( * ) Notice: Subject to any disclaimer, the term of this patent is extended or adjusted under 35 U.S.C. 154(b) by 241 days.

(21) Appl. No.: 11/159,465

(22) Filed: Jun. 23, 2005

(65) Prior Publication Data

US 2006/0288947 A1    Dec. 28, 2006

(51) Int. Cl.
*A01K 7/06* (2006.01)

(52) U.S. Cl. .......................................... 119/75; 239/24
(58) Field of Classification Search ............. 119/72–75; 239/16, 17, 23, 24, 67
See application file for complete search history.

(56) References Cited

U.S. PATENT DOCUMENTS

| | | | | |
|---|---|---|---|---|
| 4,705,216 A | * | 11/1987 | Kaffka et al. ................. | 239/18 |
| 4,716,605 A | * | 1/1988 | Shepherd et al. ............. | 4/541.2 |
| 4,817,312 A | * | 4/1989 | Fuller et al. .................... | 40/439 |
| 4,872,485 A | * | 10/1989 | Laverty, Jr. ............. | 137/624.11 |
| 5,495,826 A | * | 3/1996 | Lindbloom et al. ........... | 119/75 |
| 5,501,178 A | * | 3/1996 | Kemp .......................... | 119/74 |
| 5,799,609 A | * | 9/1998 | Burns et al. ................... | 119/74 |
| 6,526,916 B1 | * | 3/2003 | Perlsweig .................... | 119/74 |
| 6,792,891 B1 | * | 9/2004 | Coburn et al. ................. | 119/72 |
| 7,089,881 B2 | * | 8/2006 | Plante ......................... | 119/74 |

FOREIGN PATENT DOCUMENTS

GB    2256013 A    * 11/1992

* cited by examiner

*Primary Examiner*—Kimberly S Smith
(74) *Attorney, Agent, or Firm*—Timothy Thut Tyson; Ted Masters; Freilich, Hornbaker & Rosen

(57) ABSTRACT

An animal actuated drinking fountain has an electronic circuit for operating a pump to supply water to an animal. The fountain has a housing with a container for holding the water. A pump receives water from the container and has an upward directed discharge port for creating a fountain of water. A light emitter and light sensor are positioned so a beam of pulsed light is positioned above the surface of the water in the container. When the animal interrupts the beam of pulsed light, electronic circuitry causes the pump to turn on and create a fountain of water for the animal to drink.

14 Claims, 5 Drawing Sheets

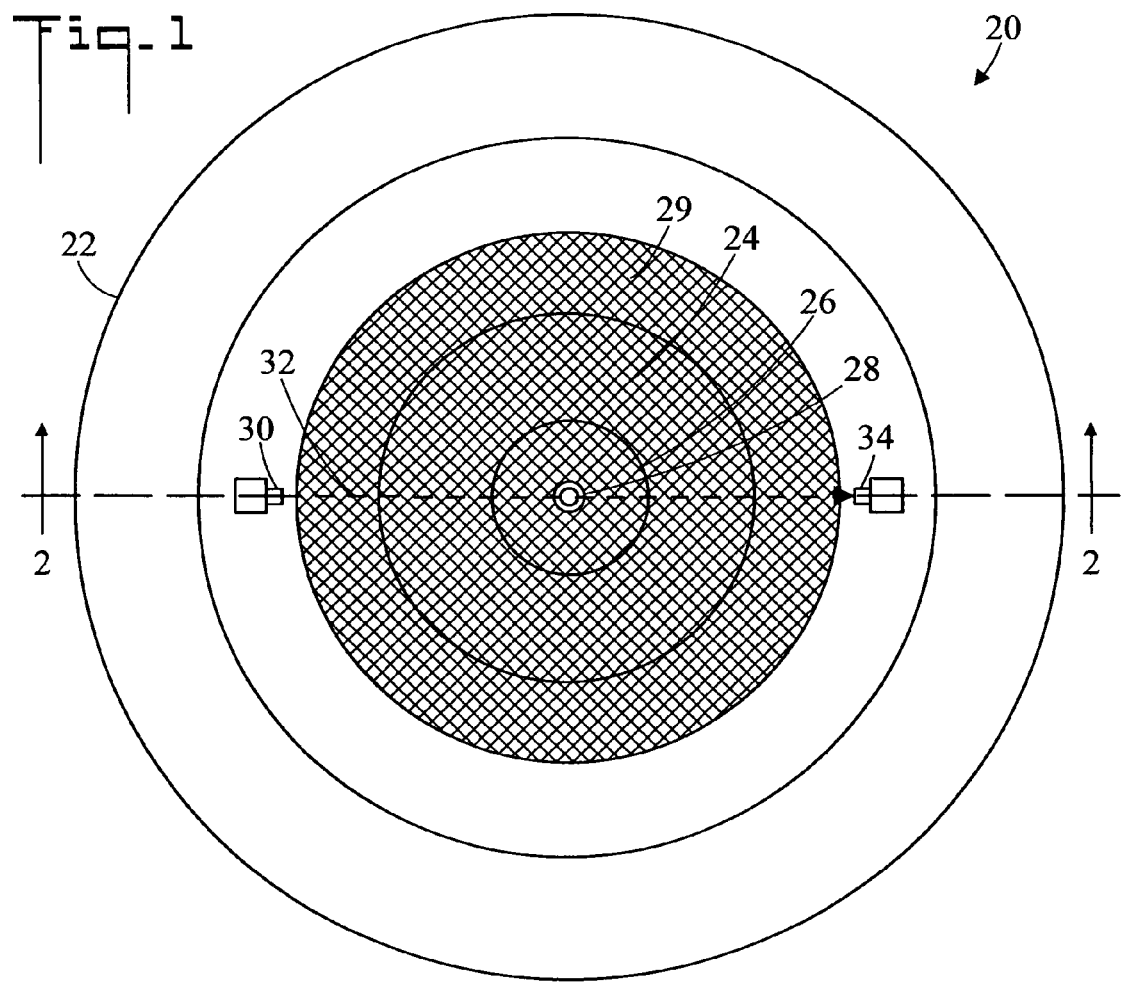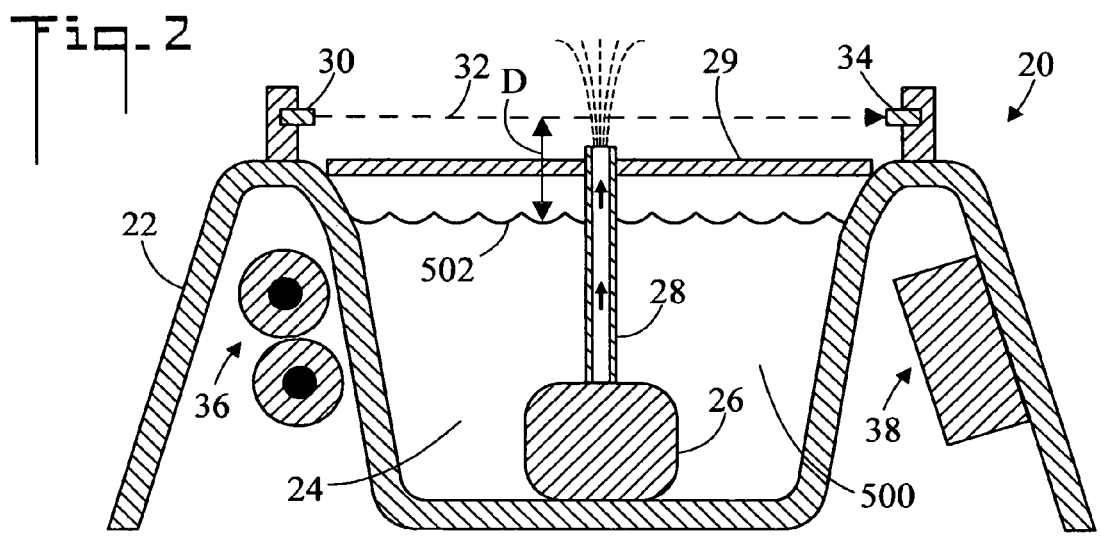

Fig_7 ns for animals, and more particularly to an animal actuated drinking fountain which utilizes the interruption of a beam of pulsed light to sense the presence of the animal and turn on the fountain.

ANIMAL ACTUATED DRINKING FOUNTAIN AND METHOD

TECHNICAL FIELD

The present invention pertains generally to drinking fountains for animals, and more particularly to an animal actuated drinking fountain which utilizes the interruption of a beam of pulsed light to sense the presence of the animal and turn on the fountain.

BACKGROUND OF THE INVENTION

Pet actuated drinking fountains are known in the art. For example, U.S. Pat. No. 6,526,916 illustrates a portable, pet actuated drinking fountain which includes a reservoir and a movable platform which is depressed against a spring when a pet steps on it. The downward movement of the platform closes a switch that connects battery power to a pump that provides a gentle bubbling of water from the reservoir via a vertical spigot reachable by the pet. Excess water drains back into the reservoir through a filter screen. When the pet steps off the movable platform, the pump is deactivated.

The fountain of U.S. Pat. No. 6,526,916 is mechanically activated requiring a number of moving parts subject to misalignment or wear if mishandled during movement from one location to another. An arrangement otherwise providing the advantages of the patented fountain but having no moving parts would avoid such problems.

BRIEF SUMMARY OF THE INVENTION

The present invention is directed to an animal actuated drinking fountain which utilizes the interruption of a beam of light to sense the presence of the animal and turn on the fountain. The light beam is pulsed to substantially reduce power consumption and, because it is pulsed, the light beam can be distinguished from ambient light, allowing the fountain to operate in sunlight or home lighting.

When an animal such as a pet dog or cat approaches the drinking fountain to drink, the beam of light is broken causing the electronic circuitry to turn on a pump which supplies water to an associated drinking area. When the animal is finished and moves away, the beam of light is restored causing the electronic circuitry to turn off the pump.

The electronic circuitry of the present invention includes a light emitter such as a light emitting diode (LED) and a light sensor such as a phototransistor. In essence the arrangement is that of a photo interrupter bridging the diameter of the container holding the liquid. Light from the LED shines on the phototransistor causing it to be activated. As long as the beam of light from the LED strikes the photo transistor, the associated electronic circuitry in the fountain responds to the activation of the photo transistor and does not supply power to the pump. When the animal interrupts the beam of light, the interruption of the pulsed light striking the phototransistor causes it to become deactivated. The electronics in the fountain senses the deactivation of the phototransistor and supplies power to the pump, turning it on to pump liquid to the animal.

In accordance with an embodiment of the invention, an animal actuated drinking fountain for supplying a liquid to an animal includes:

a housing having a container for holding the liquid;

a pump communicating with the container, the pump having a discharge port for discharging the liquid;

a light emitter for emitting a beam of pulsed light;

a light sensor for receiving the beam of pulsed light emitted by the light emitter;

the light emitter and the light sensor attached to the housing in a manner to direct the beam of pulsed light over the container; and, electronic circuitry in the housing to turn on the pump when the beam of pulsed light is interrupted.

In accordance with another aspect of the invention, the liquid has a surface and the beam of pulsed light is disposed a distance of between about one inch and four inches above the surface of the liquid.

In accordance with another aspect of the invention, the beam of pulsed light has a duty cycle of 0.1 to 0.00001.

In accordance with another aspect of the invention, the beam of pulsed light has a duty cycle of about 0.001.

In accordance with another aspect of the invention, the beam of pulsed light includes pulses having a pulse duration of 1.0 milliseconds to 0.0001 milliseconds and a pulse period of 100 milliseconds to 1000 milliseconds.

In accordance with another aspect of the invention, the beam of pulsed light includes pulses having a pulse duration of about 0.2 milliseconds and a pulse period of about 200 milliseconds.

In accordance with a further feature of the invention, a power supply in the housing provides electrical power to the pump, the light emitter, the light sensor, and associated electronic circuitry. The power supply is a battery and may include a solar panel for charging the battery or an AC to DC converter for charging the battery from household current.

Other aspects, features, and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a top plan view of an animal actuated drinking fountain for supplying a liquid to an animal in accordance with the present invention;

FIG. 2 is a cross sectional view along the line 2-2 of FIG. 1;

DETAILED DESCRIPTION OF THE INVENTION

Figure 3:
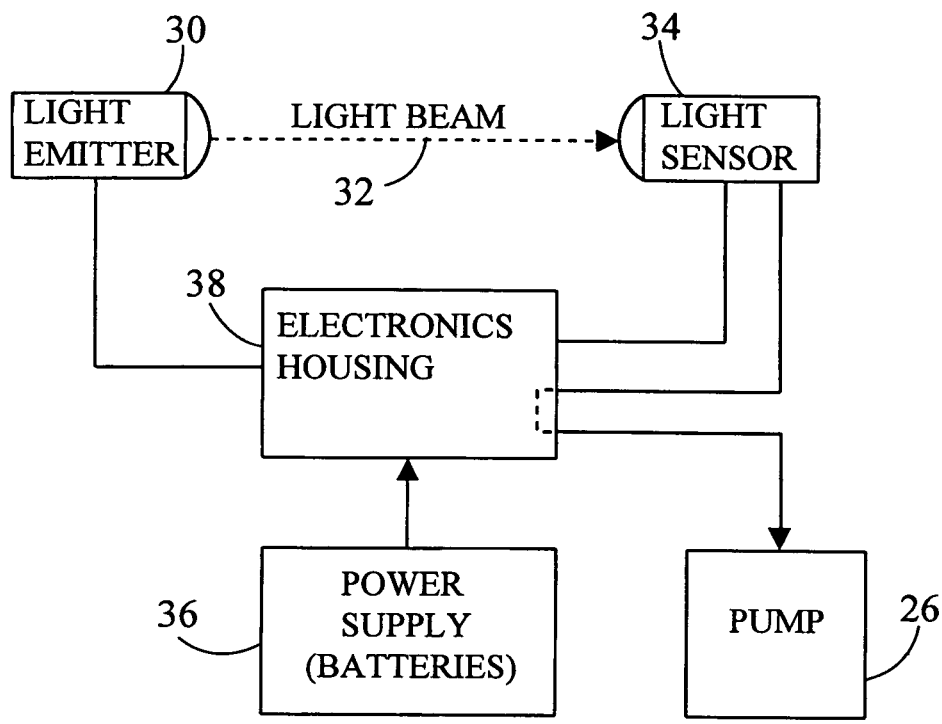
FIG. 3 is a functional schematic diagram of the drinking fountain.

FIGS. 1-3 illustrate top plan, cross sectional, and functional schematic diagram views of an animal actuated drinking fountain for supplying a liquid to an animal in accordance with the present invention, generally designated as 20. Animal actuated drinking fountain 20 includes a housing 22, which has a container 24 for holding a liquid 500. Liquid 500 would typically be drinking water. However, other liquids such as juice or milk could also be supplied. A pump 26 communicates with container 24 and has a discharge port 28 for discharging liquid 500. As used herein, pump 26 communicating with container 24 means that pump 26 has an inlet that is open to liquid 500. In the shown embodiment, pump 26 is disposed within container 24. The discharge port 28 comprises a tube that is pointed upward so that liquid 500 is discharged in a vertical stream. A cover 29 covering the open top of container 24 has a screen or wire mesh that keeps debris from entering the container while readily allowing unused liquid to return. In the shown embodiment, cover 29 is a removable. The aeration of the liquid in the vertical stream and cleaning as it passes through the screen keeps the liquid clean unlike the static condition of liquid in a traditional bowl. The pump 26, discharge port 28, and cover 29 may be as described in the aforementioned U.S. Pat. No. 6,526,916.

A light emitter 30 attached to the top of housing 22 emits a beam of pulsed light 32. A light sensor 34 attached to the top of the other side of housing 22 receives the beam of pulsed light 32 emitted by light emitter 30. In a preferred embodiment of the invention, holders for light emitter 30 and light sensor 34 are molded into housing 22. This arrangement of light emitter 30 and light sensor 34 positions the beam of pulsed light 32 over container 24. Having beam of pulsed light 32 a distance of approximately one inch to four inches above the surface of the liquid 502, with approximately two inches being preferred, has been found useful to timely activate the pump when an animal approaches. Light sensor 34 is coupled to pump 26 via electronic circuitry so that the pump will be activated when beam of pulsed light 32 is interrupted by the animal to discharge a vertical stream of liquid 500 from port 28 for the animal to drink.

A power supply 36 provides electrical power to pump 26, light emitter 30, light sensor 34, and the electronic circuitry in electronics housing 38. In the shown embodiment, power supply 36 includes a battery or batteries. A solar panel may also be utilized to charge rechargeable batteries as discussed in reference to FIGS. 6-7. If desired, the power supply 36 may be configured to accept an AC to DC converter to enable the unit to be operated on 110 volt house current to recharge the rechargeable batteries.

Figure 4:
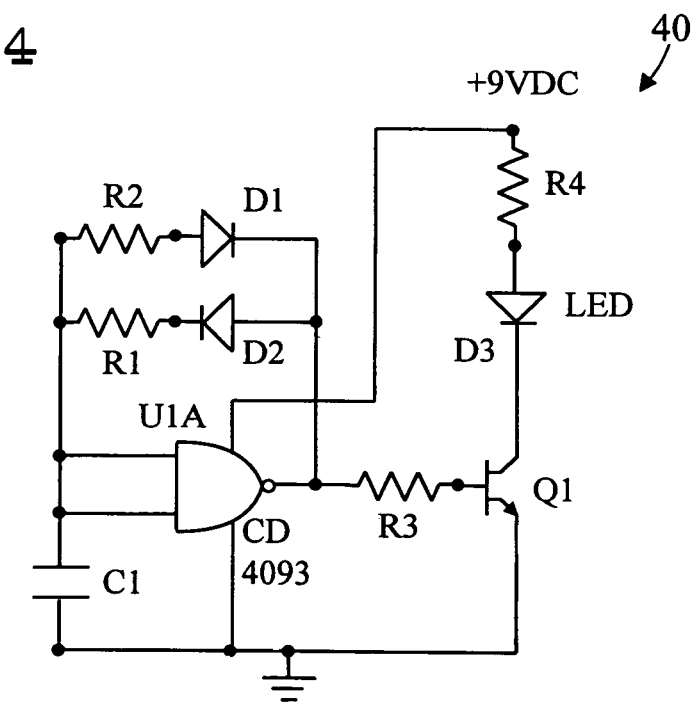
FIG. 4 is a schematic diagram of a pulse circuit.

FIG. 4 is a schematic diagram of a pulse circuit 40 for the LED, that is light emitter 30 of FIGS. 1-3, for producing a beam of pulsed light. Pulse circuit 40 is a classical relaxation oscillator made to deliver a very short pulse of about 0.2 milliseconds at a repetition frequency of about 200 milliseconds. This provides a duty cycle (the ratio of pulse duration to pulse period) of 0.001. The skewed duration is achieved by using different return paths for the signal from the output of gate U1A to its input through two separate diodes D1 and D2. This signal charges and discharges capacitor C1 thereby giving the characteristic pulse at the output of the gate. Gate U1A is a Schmidt trigger device, in this case a CD4093, but other similar arrangements can be used such as a LM555 or discrete components. The "ON time" output from the gate is fed back to the capacitor C1 through diode D2 and resistor R1, which is 8.2 kΩ, thereby charging the capacitor C1 quickly to create a short pulse. The "OFF time" is fed back through D1, with a very large resistor, R2, which is 10 megΩ, which gives a long period for C1 to discharge. The result is a very short ON to OFF time relationship of the pulse. This arrangement is used since it is necessary to conserve power from the battery as much as possible. The power here, for the most part, is used when the LED D3 is ON. The LED is ON only for the positive duration of the pulse from the oscillator. Since this happens only ¹⁄₁₀₀₀ of the total pulse time, this means that the current consumption by the LED is very small and happens only at intervals that are ¹⁄₁₀₀₀ of the full time duration. The LED therefore consumes only ¹⁄₁₀₀₀ of the power it would consume if it were on continuously. This type of circuit is known in the industry as a light chopper since it "chops" the light into small packets before it sends it from the emitter to the sensor.

The LED is driven by a transistor, Q1, which can be a 2N3904 or similar device. In a preferred embodiment, a TIP120 transistor is used since it has a much higher gain (it is a Darlington device). The base of this transistor is connected to the output of the oscillator through R3, a 1 kΩ resistor.

In addition to consuming much less power, the pulsed beam of light emitted by light emitter 30 has another advantage. The pulsed beam of light can be detected even in strong ambient light such as direct sunlight. This is because pulses of light, which are basically alternating current (AC) in form, are very easy to discern from the background ambient light, which is basically direct current (DC) in form. The background light may also change but the changes are so slow that for all practical purposes they are considered DC since it takes many hours for the sun to go from morning to noon to evening. The AC pulses of the light chopper, which are very fast and short, can be passed through a high-pass-filter that lets these pulses through but blocks the DC background from the sun or house lamps.

Figure 5:
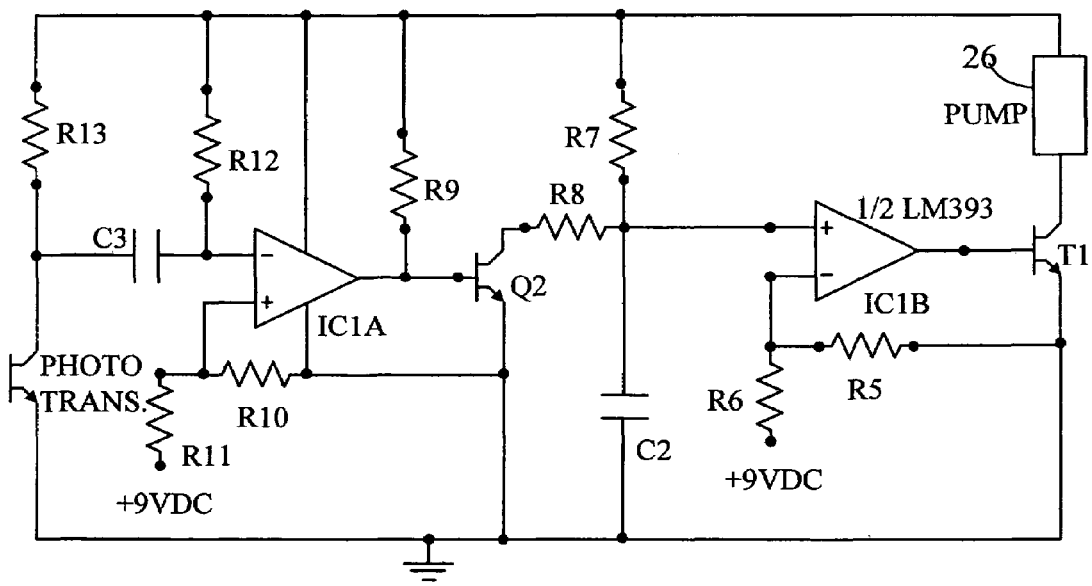
FIG. 5 is a schematic diagram of a sensor circuit.

FIG. 5 is a schematic diagram of the sensor circuit 42. The front end of sensor circuit 42 is an infrared phototransistor that is the light sensor 34 of FIGS. 1-3. The infrared phototransistor has a pull-up resistor in its collector, R13, of 15 kΩ. The phototransistor is normally off and thus consumes no power since no current passes through it. When the short pulse from light emitter 30 hits the phototransistor, it turns on briefly such as for 0.2 milliseconds. The collector goes to ground momentarily producing a pulse that is transferred through capacitor C3 to the negative input of the first comparator IC1A. Capacitor C3 is included as a high-pass-filter to prevent DC from going through and triggering the device. As such, sensor circuit 42 is impervious to ambient light variations such as the turning of room lights on and off or placement of the drinking fountain outdoors in direct sunlight. First comparator IC1A is normally low at its output. When the pulse from the phototransistor and capacitor C3 is fed to its inverting input, its output goes momentarily high which turns on transistor Q2. The output of Q2 is normally high and goes low when Q2 is turned on by the pulse from IC1A.

Capacitor C2 and resistor R7 form a charging network connected to the positive input of a second comparator IC1B. The output of second comparator IC1B is normally low. It is connected to the power Darlington T1 transistor which, when triggered, turns on pump 26. If left alone, capacitor C2 would charge up to the maximum available voltage, 9V. But since transistor Q2 is putting out constant pulses as a result of the pulses it receives from the output of the first comparator IC1A which are a result of the pulses from the phototransistor, capacitor C2 cannot charge to the maximum voltage. Capacitor C2 charges slowly through resistor R7 to some voltage that is then discharged quickly through transistor Q2 when it is turned on by the pulses of light. Resistor R8 in the collector of transistor Q2 prevents the destruction of transistor Q2 during the discharge.

The negative input of second comparator IC1B is held at a constant 4.5V by the voltage divider resistor R6 and resistor R5. The trigger point for this comparator at its positive input is therefore 4.5V. But the capacitor C2/resistor R7 network cannot charge to this voltage due to the pulses from transistor Q2 which keep resetting the voltage that accumulates on capacitor C2. Hence, the voltage at the positive input of second comparator IC1B cannot reach the trip point of 4.5V and thus the output of second comparator IC1B is kept at low keeping transistor T1 and pump 26 off.

When the animal puts its head in the path of light beam 32, the beam is interrupted and no pulses reach the phototransistor. Hence no pulses are available from transistor Q2 to reset the voltage on capacitor C2. Capacitor C2 can now charge to its maximum available voltage of 9V. But as soon as its voltage reaches a value slightly higher than 4.5V, the voltage on the capacitor supplied to the positive input of second comparator IC1B exceeds the voltage on the negative input of comparator IC1B triggering second comparator IC1B and making it change states at its output to high. The high output turns on T1 which turns on pump 26.

After the animal moves away, the path of the light beam is no longer blocked. The scenario described above starts again and the pulses from the transistor Q2 discharge the capacitor C2 rapidly causing the positive input of comparator IC1B to go below the value of the 4.5V trip point. This causes the output of comparator IC1B to go low turning off transistor T1 and thereby turning off pump 26.

It is estimated that the present invention can operate for a minimum of 4286 hours (178 days) on six C size 1.5 volt batteries. This time can be further extended by using specialized batteries such as NiMH, lithium, or rechargeable batteries, which will extend the operation time even further. However, this time is dependent upon the frequency of the dynamic operation of the fountain caused by the animal drinking water. The fountain will draw the greatest amount of current from the battery when the pump 26 is operated. An on-off switch may also be utilized to allow the user to turn the electronics off when not needed.

Component values for capacitors and resistors of emitter circuit 40 and sensor circuit 42 are shown in Table 1.

TABLE 1

| COMPONENT VALUES | |
|---|---|
| C1 | .05 u |
| C2 | 4.7 u |
| C3 | .56 u |
| R1 | 8.2k |
| R2 | 10 meg |
| R3 | 1k |
| R4 | 100 |
| R5 | 47k |
| R6 | 47k |
| R7 | 100k |
| R8 | 1k |
| R9 | 47k |
| R10 | 27k |
| R11 | 120k |
| R12 | 47k |
| R13 | 15k |
| D1, D2 | 1N4148 |
| D3 | LED |

It may be appreciated that while the shown embodiment of the invention utilizes a duty cycle of about 0.001, a pulse duration of about 0.2 milliseconds, and a pulse period of about 200 milliseconds, other values for these parameters are also possible. A duty cycle of 0.1 to 0.00001 could also be used. A pulse duration of 1.0 milliseconds to 0.0001 milliseconds could also be used. And a pulse period of 100 milliseconds to 1000 milliseconds could also be used.

Figure 6:
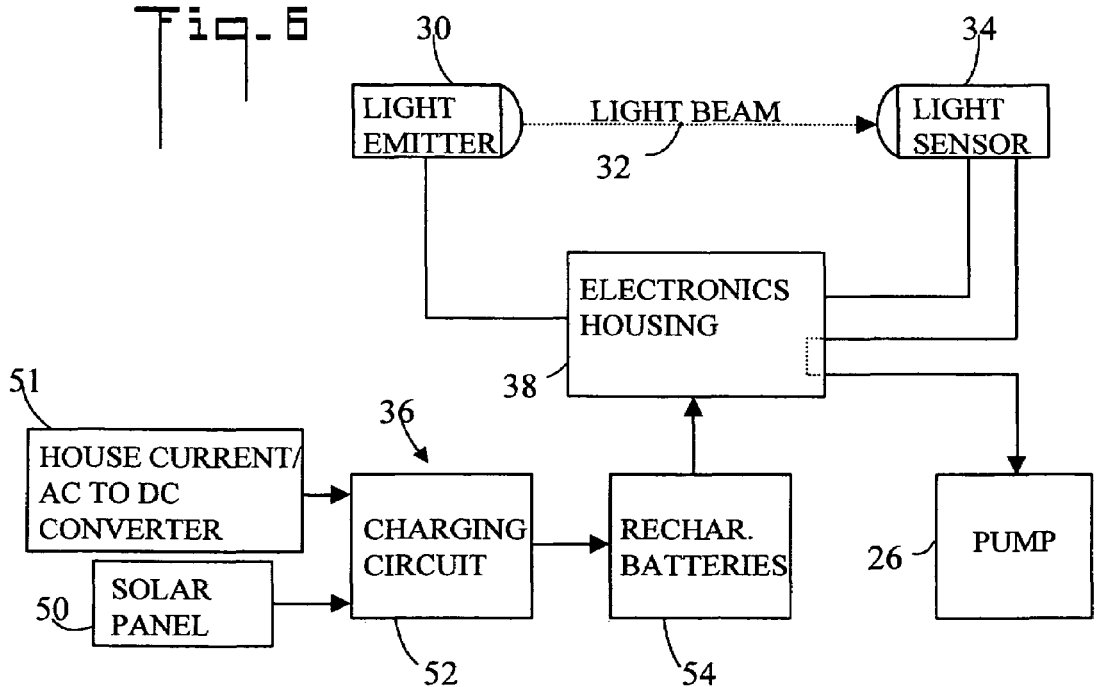
FIG. 6 is a functional schematic diagram of a second embodiment.
Figure 7:
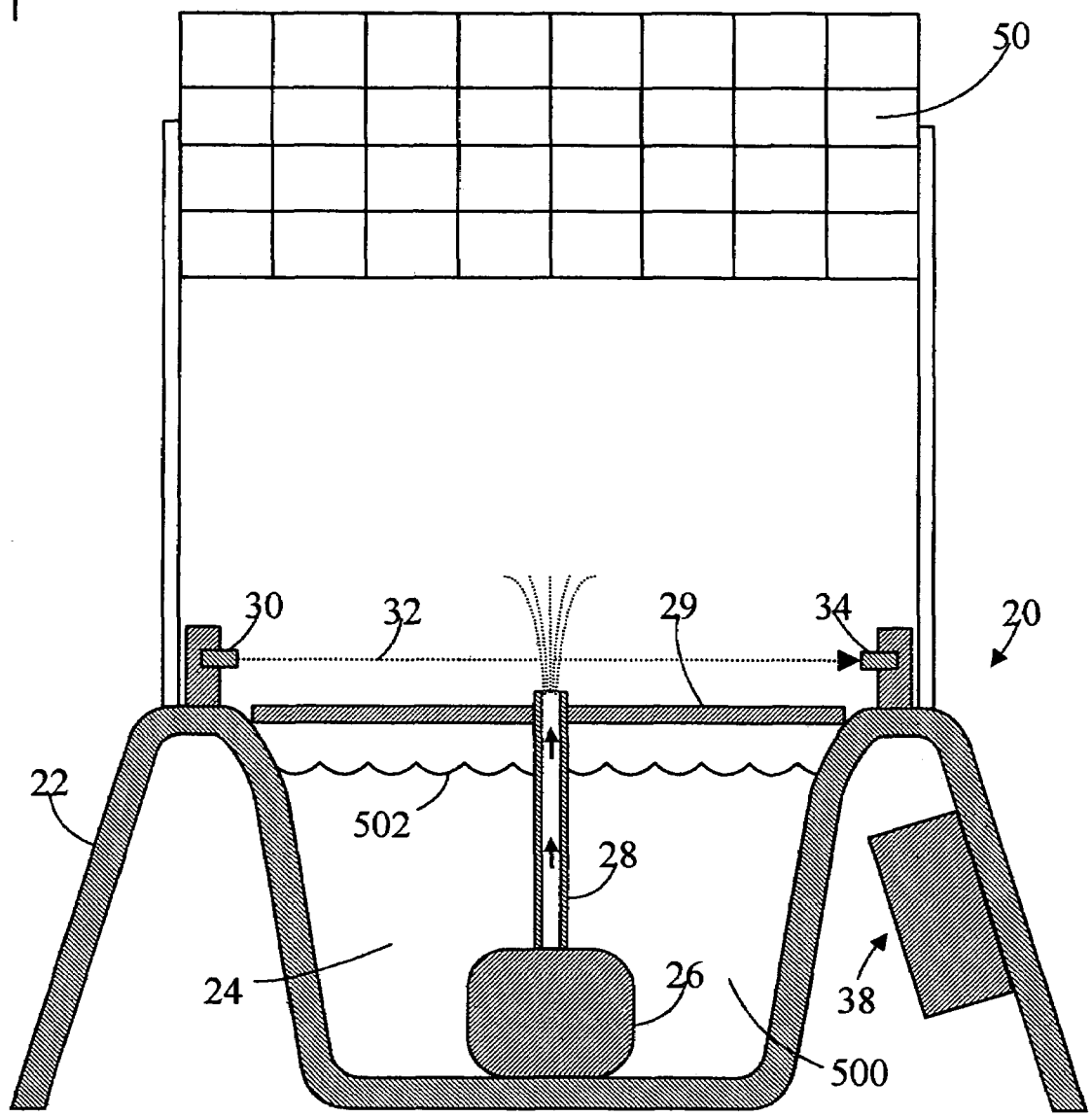
FIG. 7 is a cross sectional view of the second embodiment.

FIGS. 6 and 7 are a functional schematic diagram and a cross sectional view, respectively, of a second embodiment of the present invention. In this embodiment, power supply 36 is comprised of a solar panel 50, charging circuitry 52, and a rechargeable battery 54. The charging circuitry 52 and rechargeable battery 54 can be contained within electronics housing 38. An AC to DC converter 51 may also be provided to enable the unit to be operated on 110 volt house current to recharge the rechargeable batteries.

In terms of use, a method for an animal to drink a liquid includes:
 (a) providing a liquid 500;
 (b) providing a drinking fountain 20 including:
  a housing 22 having a container 24 for holding liquid 500;
  a pump 26 communicating with container 24 having a discharge port 28 for discharging liquid 500;
  a light emitter 30 emitting a beam of pulsed light 32;
  a light sensor 34 receiving the beam of pulsed light 32 emitted by light emitter 30;
  light emitter 30 and light sensor 34 attached to housing 22 so that beam of pulsed light 32 is directed over container 24; and,
  when said beam of pulsed light is interrupted said pump is turned on;
 (c) placing liquid 500 in container 24;
 (d) placing drinking fountain 20 in ambient light;
 (e) the animal interrupting beam of pulsed light 32 causing pump 26 to activate and discharge liquid 500 from discharge port 28; and,
 (f) the animal drinking liquid 500 from discharge port 28.

The method further including:
 in step (a), liquid 500 having a surface 502; and,
 in step (b), beam of pulsed light 32 disposed a distance D of between about one inch and about four inches above surface 502 of liquid 500.

The method further including in step (b), beam of pulsed light 32 having a duty cycle of 0.1 to 0.00001.

The method further including in step (b), beam of pulsed light 32 having a duty cycle of about 0.001.

The method further including in step (b), beam of pulsed light 32 including pulses having a pulse duration of 1.0 milliseconds to 0.0001 milliseconds, and a pulse period of 100 milliseconds to 1000 milliseconds.

The method further including in step (b), beam of pulsed light 32 including pulses having a pulse duration of about 0.2 milliseconds and a pulse period of about 200 milliseconds.

The method further including in step (b), drinking fountain 20 further including a power supply 36 for providing electrical power to pump 26, light emitter 30, light sensor 34, and associated electronic circuitry, power supply 36 being a battery and may include a solar panel for recharging the battery or an AC to DC converter for using house current to recharge the battery.

Figure 8:
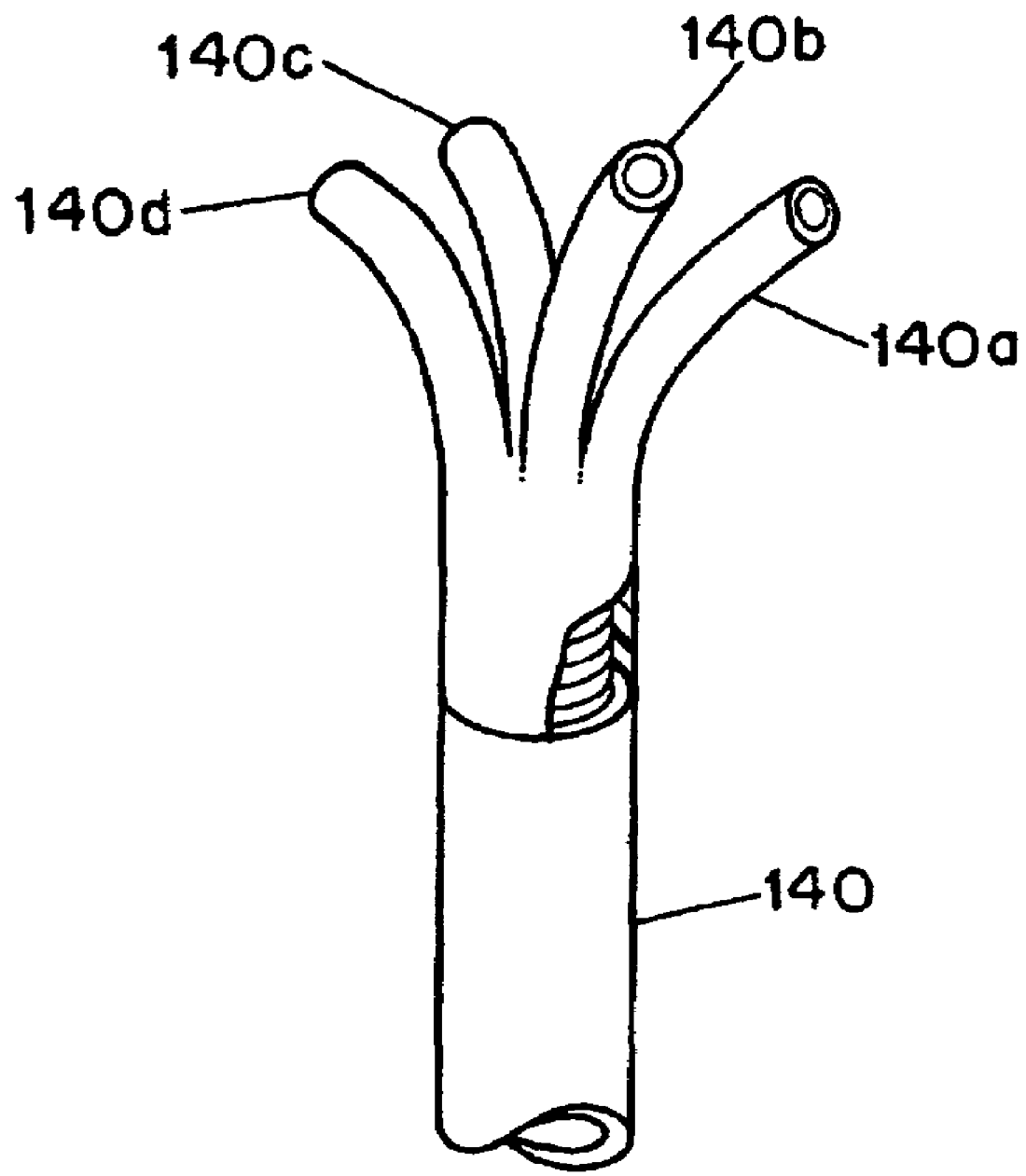
FIG. 8 is an enlarged perspective view of a branched discharge port that may be used with the fountain.

FIG. 8 is an enlarged perspective view of a branched discharge port 140 similar to discharge port 28 of FIGS. 1, 2, and 7. The branched discharge port 140 is divided into four separate output ends 140*a-d* allowing multiple pets to drink at the same time. The branched discharge port 140 preferably has a threaded connection as shown to facilitate disassembly and reassembly for cleaning.

The preferred embodiments of the invention described herein are exemplary and numerous modifications, variations, and rearrangements can be readily envisioned to achieve an equivalent result, all of which are intended to be embraced within the scope of the appended claims.

We claim:
1. An animal actuated drinking fountain for supplying a liquid to an animal, comprising:
 a housing having a container for holding the liquid;
 a pump communicating with said container, said pump having a discharge port for discharging the liquid;
 a light emitter for emitting a beam of pulsed light;
 a light sensor for directly receiving said beam of pulsed light emitted by said light emitter; and said light emitter and said light sensor attached to said housing so that said beam of pulsed light is directed over said container; wherein reception of said beam of pulsed light by said light sensor being effective to maintain said pump inoperative; and, interruption of said beam of pulsed light by the animal being effective to turn on said pump.

2. The animal actuated drinking fountain according to claim 1, the liquid having a surface, said animal actuated drinking fountain further including said beam of pulsed light disposed a distance of between about one inch and about four inches above the surface of the liquid.

3. The animal actuated drinking fountain according to claim 1, further including said beam of pulsed light having a duty cycle of 0.1 to 0.00001.

4. The animal actuated drinking fountain according to claim 1, further including said beam of pulsed light having a duty cycle of about 0.001.

5. The animal actuated drinking fountain according to claim 1, further including said beam of pulsed light including pulses having a pulse duration of 1.0 milliseconds to 0.0001 milliseconds, and a pulse period of 100 milliseconds to 1000 milliseconds.

6. The animal actuated drinking fountain according to claim 1, further including said beam of pulsed light including pulses having a pulse duration of about 0.2 milliseconds and a pulse period of about 200 milliseconds.

7. The animal actuated drinking fountain according to claim 1, further including:

the liquid having a surface;

said beam of pulsed light disposed a distance of between about one inch and about four inches above the surface of the liquid;

said beam of pulsed light having a duty cycle of about 0.001; and, said beam of pulsed light including pulses having a pulse duration of about 0.2 milliseconds and a pulse period of about 200 milliseconds.

8. A method for an animal to drink a liquid, comprising:
(a) providing a liquid;
(b) providing an animal actuated drinking fountain including:
  a housing having a container for holding said liquid;
  a pump communicating with said container, said pump having a discharge port for discharging said liquid;
  a light emitter emitting a beam of pulsed light;
  a light sensor directly receiving said beam of pulsed light emitted by said light emitter;
  said light emitter and said light sensor attached to said housing so that said beam of pulsed light is directed over said container; and,
  wherein, reception of said beam of pulsed light by said light sensor being effective t maintain said pump inoperative; and
  when said beam of pulsed light is interrupted said pump is turned on;
(c) placing said liquid in said container;
(d) placing said animal actuated drinking fountain in ambient light;
(e) the animal interrupting said beam of pulsed light causing said pump to turn on and discharge said liquid from said discharge port; and,
(f) the animal drinking said liquid from said discharge port.

9. The method of claim 8, further including:

in step (a), said liquid having a surface; and, in step (b), said beam of pulsed light disposed a distance of between about one inch and about four inches above said surface of said liquid.

10. The method of claim 8, further including in step (b), said beam of pulsed light having a duty cycle of 0.1 to 0.00001.

11. The method of claim 10, further including in step (b), said beam of pulsed light having a duty cycle of about 0.001.

12. The method of claim 8, further including in step (b), said beam of pulsed light including pulses having a pulse duration of 1.0 milliseconds to 0.00001 milliseconds, and a pulse period of 100 milliseconds to 1000 milliseconds.

13. The method of claim 12, further including in step (b), said beam of pulsed light including pulses having a pulse duration of about 0.2 milliseconds and a pulse period of about 200 milliseconds.

14. The method of claim 8, further including in step (b), said animal actuated drinking fountain further including a power supply for providing electrical power to said pump, said light emitter, and said light sensor, said power supply being one of (1) a battery, (2) a solar panel recharging a battery, and (3) an AC to DC converter recharging a battery.

* * * * *